Dec. 5, 1961     J. L. DENNISTON     3,011,741
AIRCRAFT CONTROL SYSTEM
Filed Aug. 2, 1957     2 Sheets-Sheet 1
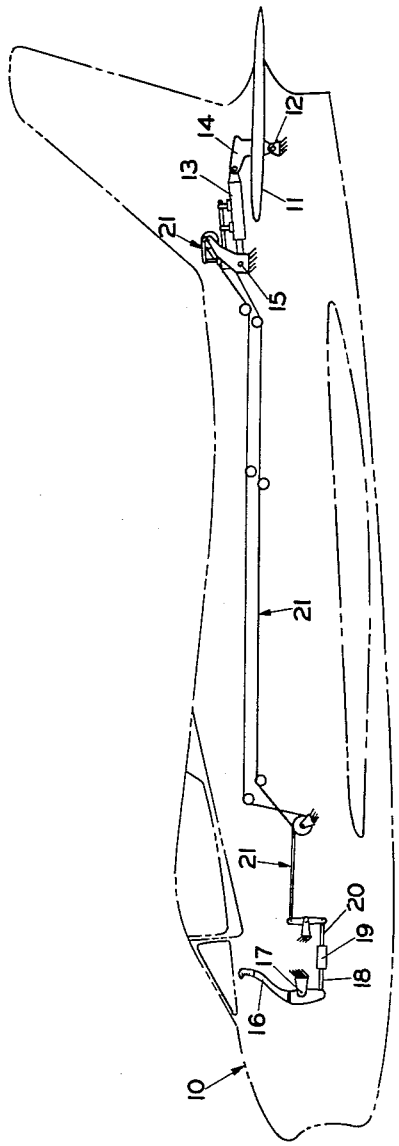
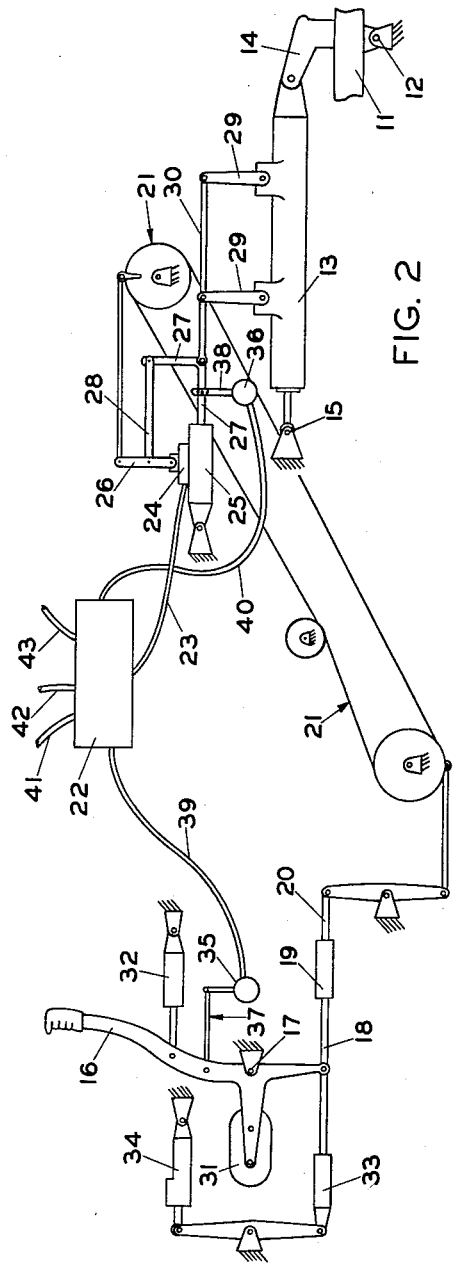
*INVENTOR.*
JAMES L. DENNISTON
BY
ATTORNEY Dec. 5, 1961     J. L. DENNISTON     3,011,741
AIRCRAFT CONTROL SYSTEM
Filed Aug. 2, 1957     2 Sheets-Sheet 2
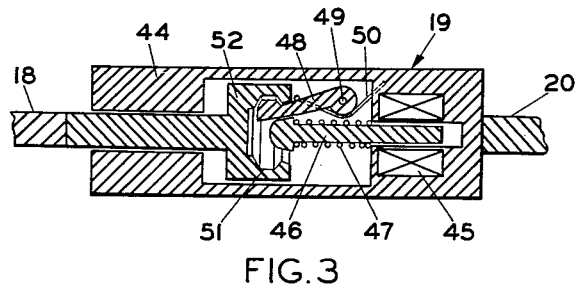
FIG. 3
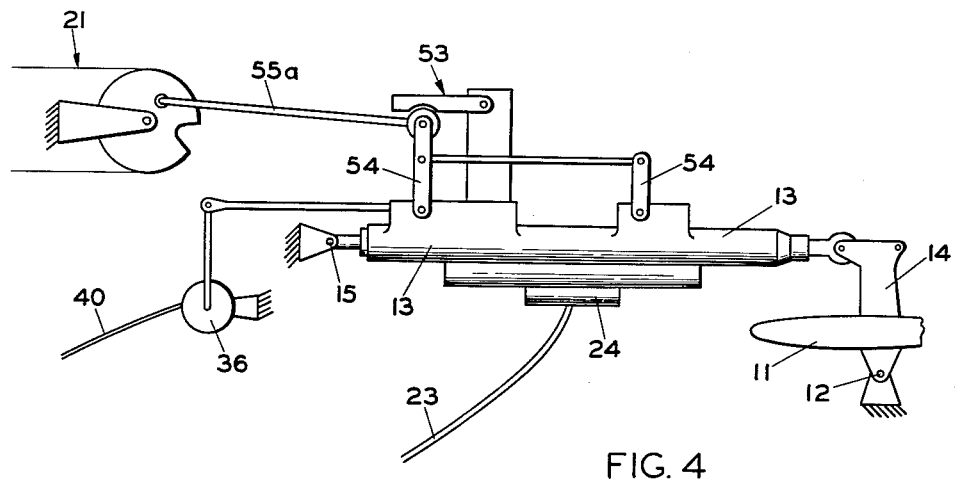
FIG. 4
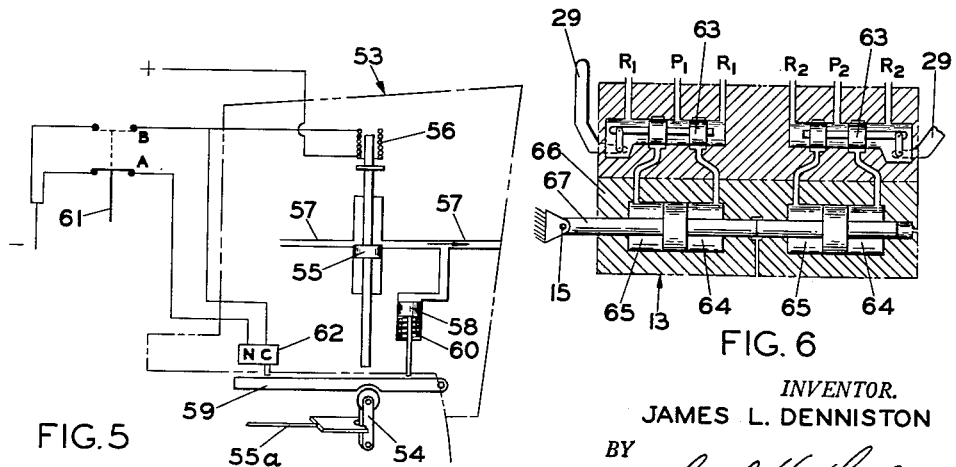
FIG. 5
FIG. 6
INVENTOR.
JAMES L. DENNISTON
BY
ATTORNEY

United States Patent Office 3,011,741
Patented Dec. 5, 1961

3,011,741
AIRCRAFT CONTROL SYSTEM
James L. Denniston, Columbus, Ohio, assignor to
North American Aviation, Inc.
Filed Aug. 2, 1957, Ser. No. 675,897
4 Claims. (Cl. 244—83)

This invention pertains generally to an aircraft control system and particularly relates to a flight control system having a powered actuator for positioning a movable aircraft control surface and improved means for directionally regulating movement and position of the so-powered control surface.

Modern aircraft, and particularly those of a high-performance type, generally utilize powered actuators to movably position various control surfaces during flight operation; if such aircraft are further of the piloted type, their flight control systems are provided with means for directionally regulating movement and position of the actuators and associated control surfaces in response to signals originating as manual efforts by a pilot. Typical signal-transmitting arrangements have generally employed such means as a pivoted control stick coupled to a directional valving member, or its equivalent, cooperably associated with the powered actuator; frequently the coupling is effected through a mechanical linkage comprised of various elements such as levers, bell-cranks, rods, cables, cable pulleys, cable connectors, and the like. Some piloted aircraft which advantageously use powered actuators are further provided with a secondary regulating linkage, generally a parallel mechanical linkage duplicating the function of the primary arrangement, for use in emergency situations wherein the primary linkage has failed.

Recent developments in the realm of high-performance, high-density aircraft having long-range, high-speed, high-altitude operational capabilities have pointed-up numerous problems with respect to such heretofore known forms of aircraft flight control systems. Many such problems relate to ease of manual operation or sensitivity of the control system in response to pilot efforts; frequently problems have been encountered in providing totally adequate emergency control capabilities in the system. Also, problems relating to system weight reduction, reliability of operation, and system performance have been given greater importance. Generally, known forms of flight control systems have not proven entirely satisfactory for application to high-performance aircraft.

To overcome these various deficiencies I have invented an electro-mechanically regulated flight control system for air-craft control surface operation. This invention contemplates that throughout normal flight operations the system's powering devices, which may take the form of hydraulic actuators and the like, will be regulated in their actuation by essentially electrical means; pilot-feel characteristics artificially incorporated into the system will be maintained at ideal levels throughout such normal operation. In emergency or in selected situations, the system's regulation will be accomplished manually through a direct mechanical linkage coupling and it is contemplated that the pilot-effort required will be of a magnitude appreciably greater than that required during the heretofore described normal operation of the system.

Also, the system is so arranged that its emergency operation can be nearly instantaneously initiated without requiring preliminary lost-motion efforts on the part of the pilot; further, a mechanical linkage which serves as the alternate coupling is so arranged that it is a trailing system. As such, those linkage position changes required during normal operation of the system to continuously place it in a "ready" position are effected by the system's powered actuators thus avoiding the introduction of adverse reactive forces into the control stick portion of the flight control system.

Accordingly, it is an object of this invention to provide an aircraft control system which will optimumly utilize electrical and mechanical principles of operation and which fully utilize available power sources throughout normal and emergency flight situations.

Another object of this invention is to provide an aircraft control system requiring a minimum of manual effort to overcome frictional resistance to motion during normal operation thereof and having features incorporated therein providing, at all times throughout system normal operation, the ideal degree of artificial feel in the control stick portion of the system.

Another object of this invention is to provide a form of aircraft control system wherein the pilot of the aircraft is provided with direct manual control over regulating elements of the system in emergency situations and wherein the emergency take-over may be effected without requiring lost-motion efforts of a manual nature.

Another object of this invention is to provide an aircraft control system wherein an alternately utilizable mechanical linkage disengageably coupled to a control stick member is continuously re-positioned for emergency use without requiring pilot-effort to accomplish such re-positioning.

Still another object of this invention is to provide a form of aircraft control system that may advantageously utilize auxiliary control equipment such as conventional autopilots, yaw dampers, pitch correction systems, and other aerodynamic corrective devices of an electrical or electronic nature.

Another object of this invention is to provide a form of aircraft flight control system that optimumly utilizes mechanical components such as artificial feel bungees, bob-weights, trim actuators, and the like.

Another object of this invention is to provide a form of aircraft control system which is not adversely affected in its normal operation by temperature variations encountered throughout a wide range of temperature values.

Another object of this invention is to provide a flight control system for aircraft which will function effectively even though installed in large-type, high-density aircraft wherein control surfaces are located quite distant from the pilot-manned control center and wherein the frictional forces associated with control surface actuator regulation are generally of a high magnitude.

Another object of this invention is to provide a form of aircraft control system having a minimum total weight requirement for a control system of its capabilities and further having a high degree of operational reliability.

Other objects and advantages of my invention will become more apparent when consideration is given to the written description and drawings comprising portions of this application.

In the drawings, wherein like reference numerals are utilized to designate like components or parts throughout the same:

FIG. 1 is an elevational view showing portions of the control system of this invention schematically, and further generally showing their positioned relationship to an aircraft outlined in phantom lines;

FIG. 2 is a schematic diagram showing the control system of this invention in greater detail;

FIG. 3 is a schematic sectional view taken through a lock-out clutch component which may be utilized in the mechanical sub-system portion of this invention;

FIG. 4 is a schematic diagram showing another embodiment of a portion of the control system of this invention;

FIG. 5 is a schematic diagram showing operative details of the detent portion of the system features illustrated in FIG. 4; and FIG. 6 is a schematic sectional view of a tandem-type hydraulic actuator having a neutrally centered hydraulic valve member associated therewith.

The control system of this invention may be utilized advantageously with any of the various flight control surfaces typically associated with an aircraft. By way of example, FIG. 1 illustrates portions of a flight control system combining therein horizontal stabilizer 11 of the aircraft generally designated as 10. Horizontal stabilizer 11 pivots about point 12, which is fixed relative to fuselage structure of the aircraft, and generally controls or causes pitching of the aircraft when rotated from its normal position during flight.

Any of several forms of powering arrangements might be utilized to actuate the control surface 11; the system of this invention contemplates use of a high-pressure hydraulic source for boost power although it is recognized that pneumatic or electrical power sources might prove equally as satisfactory. Accordingly, an extensible hydraulic actuator 13 is illustrated in FIGS. 1, 2, and 4 as rotationally positioning stabilizer 11 about its pivot point 12 and relative to the aircraft fuselage. The cylinder or body portion of actuator 13 is pivotally attached to the stabilizer center beam 14 and the rod portion of actuator 13 is pivotally attached to the fuselage structure at pivot point 15. Directional valving of the actuator is preferably accomplished through a servo system as will hereinafter be more fully explained.

The engine-driven pump component, hydraulic fluid reservoir, relief valve, hydraulic pressure and return lines, and the like which are typically associated with hydraulic systems are not illustrated in the drawings or described with great detail herein; their function, construction, and operation are well known by those familiar with the art.

Also forming a portion of the system of this invention is a pilot-actuated control stick 16 which is pivotally secured to the structure of airplane 10 at 17; control stick 16 is preferably mechanically disengageable from the mechanical linkage portion of the control system through disengaging means illustrated in the form of lock-out clutch member 19. A portion of lock-out clutch 19 is connected directly to the rod 18 attached pivotally to the lower extreme of control member 16; another portion of lock-out clutch 19 is secured directly to rod 20 and it in turn is attached to, and forms a portion of, the mechanical linkage indicated generally at 21. As shown in FIG. 1 in a schematic manner, mechanical linkage 21 is essentially a cable arrangement providing direct mechanical coupling between the control stick portion of the system and directional valving members associated with hydraulic surface actuator 13; only when the disengaging means 19 is fully engaged is a direct mechanical coupling effected.

It is recognized that the mechanical portion of this invention may take any of numerous specific forms; generally though, it is comprised of an arrangement of lever arms, pulleys, bell-cranks, and the like pivotally attached to structural components of the aircraft and interconnected by control cables, connecting rods, and the like. It should be pointed out that such mechanical linkages or mechanical sub-systems are characterized by the presence of a degree of frictional resistance to motion. Such frictional resistance may exist to an intolerable degree in aircraft which are of a comparatively large size and/or which are of a high-density construction requiring the incorporation of many routing deviations in the mechanical sub-system installation. The magnitude of these inherent motion-resisting frictional forces may be further increased by those strains created in the system by such temperature changes as are typically encountered during the operation of high-performance aircraft at extreme altitudes.

Additional details of the control system of this invention are shown in the schematic diagram of FIG. 2, particularly the arrangement utilized to minimize the pilot-required effort necessary to overcome the undesirable frictional forces which exist during normal operation of the control system. As will be noted, the invention contemplates use of an electrical regulating arrangement for normal system operation. Various control or corrective electrical signals of a character to be described later are received into an integrating amplifier 22 and the resultant signal is amplified and carried via transmission line 23 to power the electrical phase of the electro-mechanical valve 23 associated with hydraulic servo actuator 25. Valve 24 may be of a type generally similar to the Series No. 1000 valves manufactured by the Moog Valve Company of Aurora, New York, and it is provided with means whereby the valving member contained therein is positionally moved by either electrical forces or by exteriorly applied mechanical forces. Such mechanical forces may be applied to the internal valving member of valve 24 through lever arm 26 which is connected to the mechanical linkage 21 and therefore essentially a part of the mechanical sub-system.

Servo actuator 25 is provided to actuate the valving members which connect actuator 13 to each of two operating hydraulic systems; dual hydraulic system arrangements are typically provided in military aircraft to improve combat effectiveness and aircraft reliability. The body portion of servo actuator 25 is pivotally secured to aircraft structure and its rod portion 27 is connected into the mechanical sub-system linkage 21 through rod 28 and lever arm 26. Lever arms 29 mechanically position the valving members described later as being provided in association with surface actuator 13; rod 30 connects said lever arms 29 to the rod portion 27 of servo actuator 25 and thus into mechanical linkage 21.

The control stick portion of this invention may be additionally provided with a bob-weight 31, a bob-weight bungee 32, an artificial feel bungee 33, and a trim actuator 34. Such components are well known and are incorporated into the overall system to provide the pilot with an ideal degree of artificial control-stick response. Because there is a complete lack of any air-load feel at the stick 16, the double-acting, spring-type artificial feel bungee 33 is utilized; trim of the overall control system is accomplished through operation of the electric trim actuator 34 to change the "no-load" position of bungee 33, thus changing the relative position of the entire control system. Bob-weight 31 is utilized to provide a stick force proportional to flight acceleration and the bob-weight bungee 32 neutralizes the effect of bob-weight 31 during straight or normal flight. Also, the control stick portion of the invention may additionally be pivotally arranged so that the control stick 16 may be further utilized to actuate ailerons or the like for lateral flight control.

Selsyn 35 is a potentiometer-type device which transmits a signal proportional to the degree of displacement of control stick 16 from its neutral position; the transmitted signal, which also indicates the sense of stick displacement, is carried to integrating amplifier 22 through carrier 39. Selsyn 36 is similar in function to device 35 and transmits a feed-back signal to the amplifier 22 indicative of the position of control surface 11. Such selsyns, which are also referred to by terminology such as synchros, non-linear potentiometers, or position transducers, are well known in the art. Other electrical signals may be transmitted to integrating amplifier 22 from optional auxiliary equipment such as autopilots, yaw dampers, pitch correction devices, and the like through lines designated herein as 41, 42, and 43. Aerodynamic corrective or control devices of the types described are well known and may be readily utilized in the control system of the invention if desired.

A sectional elevation of lock-out clutch 19 is illustrated in FIG. 3 in a schematic manner. Body portion 44 of solenoid clutch 19 is secured to rod 20 and is provided interiorly with an electrical solenoid 45, a slidable core 46 urged outwardly from its operating position by compressed helical spring 47, and a latch member 48 pivotally secured to body portion 44 by pin 49 and urged downwardly from its engaged position by spring 50. The headed end portion of core 46 cooperates with the movable end of latch 48, and when solenoid 45 is de-energized, spring 47 overcomes the force of spring 50 and urges latch 48 into engagement with the interior annular groove 51 of hub component 52 of the clutch. When solenoid 45 is electrically energized, spring 47 is then compressed by solenoid action and latch 48 is moved out of engagement with groove 51 by spring 50. Hub 52 of the disengaging means 19 is connected to rod 18.

During normal flight operations, solenoid 45 is energized and rod 18 is mechanically disconnected from rod 20 and the mechanical sub-system linkage 21; however, when the electrical energy flow to solenoid 45 is cut off, as in an emergency or power-failure situation, rod 18 is immediately mechanically coupled directly to rod 20 and linkage 21 through the then engaged components 44 and 52 of clutch 19. Initiation of emergency phase operation of the control system is facilitated by the constant positioning of latch 48 in near-engagement or in a "ready" position relative to annular groove 51. The linkage and actuator valve components are preferably sized and placed relative to each other in a manner whereby a one-to-one (1:1) motion ratio is maintained for the clutch components attached to each rod 18 and 20. Thus, during normal flight operation, when control stick 16 is pivoted about axis 17 to cause unit displacement of rod 18 in a given direction, the movement of rod 27 of servo actuator 25 in response to the integrated flight control signal transmitted from integrating amplifier 22 to valve 24 causes the like unit displacement of rod 20 in the same direction. The control system linkage 21 is continuously re-positioned through efforts of the power actuator and its associated valving components and not through pilot-applied forces transmitted through control stick 16 and rod 18. However, if the electrical system should fail or should solenoid 45 be selectively de-energized, the pilot is then immediately provided with direct mechanical control of lever 26 and/or lever arms 29 through the lock-out clutch 19 and mechanical linkage 21. Such direct control may be effected at any time without requiring lost-motion efforts to secure a positive coupling between rods 18 and 20.

It should be pointed out that movement of levers 29 from their normal position relative to the body of surface actuator 13 causes the associated valving members to move off neutral and to direct or port high-pressure hydraulic fluid to appropriate sides of the pistons contained within the actuator and connected to the extensible actuator rod; the body portion of surface actuator 13 is then caused to move relative to the pistons and rod to return the lever arms 29 and the valving members associated therewith to their neutral or normal position. Valving arrangements of this nature are well known in the hydraulic actuator art.

By way of elaboration, reference is made to FIG. 6 which illustrates in schematic detail a section taken through a typical tandem-type hydraulic actuator and valve member combination of the above referred to design.

The high-pressure and return lines of one hydraulic system are respectively connected to ports or passageways $P_1$ and $R_1$; similar lines of a secondary hydraulic system are connected likewise to passageways $P_2$ and $R_2$. As lever arms 29 are rotated clockwise, valve spools 63 are moved to the right relative to the body 66 of actuator 13 and high pressure hydraulic fluid contained in passageways $P_1$ and $P_2$ is ported to the portions 64 of the actuator cylinder. Because portions 65 of the cylinder are ported to low pressure return passageways such as $R_1$ and $R_2$, the body of actuator 13 is free to move to the right relative to actuator rod 67 and is simultaneously therewith moved to the right relative to movable valve members 63. This is effect returns valve members 63 to their neutral or centered position relative to the actuator body 66 and stops continued motion of the actuator in the initial direction.

Normal operation of the flight control system of this invention may best be described with reference to FIG. 2. If the pilot should wish to pitch the ship upward into a climb by causing stabilizer 11 to rotate counter-clockwise about its pivot point 12, he may initiate the action by pulling backward on control stick 16 or in effect rotating it clockwise about its pivot 17. Simultaneously therewith, a demand signal is transmitted through selsyn 35 and line 39 to the integrating amplifier 22 where it is combined with other anticipatory signals or corrective signals which have likewise been transmitted to the amplifier but via carriers such as 40, 41, 42, and 43. A proper resultant signal is instantaneously amplified and transmitted from amplifier 22 to electro-mechanical valve 24 through line 23. Valve 24 ports high-pressure hydraulic fluid into servo actuator 25 and causes its rod portion 27 to move to the left. At the same time, levers 26 and 29 are each moved counter-clockwise by the force of rod portion 27 of the servo actuator; this causes directionally regulated movement of the body of actuator 13 and re-positioning of mechanical linkage 21—actions which occur at the same time. Levers 29 move normally centered valve spools contained in actuator 13 for directional regulation of its movement in a manner whereby the body of powered actuator 13 is moved toward pivot point 15 to thus cause control surface 11 to rotate counter-clockwise about pivot 12. The simultaneous movement of linkage 21 causes rod 20 to be moved leftward at the same rate rod 18 is moved to the left by a clockwise rotation of control stick 16. During this actuation of the control system, rod 18 is mechanically disengaged from rod 20 by electrical energization of disengaging means 19. Movement of the control stick 16 in a counter-clockwise direction causes a reverse operation or movement of the control system components.

An alternate embodiment of a portion of the control system of this invention is illustrated in FIG. 4. This embodiment is generally similar to the like system portion illustrated in FIG. 2 save that certain features of the electro-mechanical valve 24 and hydraulic servo actuator 25 are incorporated integrally with the body portion of surface actuator 13, and a detent arrangement 53 is utilized to provide a modification in the mechanical linkage portion of the system.

In the arrangement of FIG. 4, valving of the surface actuator 13 is normally accomplished through a servo valve mechanism integrally associated with the actuator body and controlled through appropriate porting of the electrical hydraulic valve 24; however, this latter valve is not provided with a co-acting lever arm such as the lever 26 illustrated in FIG. 2. Rather, a tandem valving arrangement utilizing lever arms 54 is employed for use only in the emergency or selected situations hereinbefore referred to. During normal operation of the system, lever arms 54 and their associated valve spools are retained in their neutral position by detent device 53 and thus do not interfere with normal operation of powered actuator 13.

As the body portion of surface actuator 13 is moved relative to pivot point 15, positive motion of linkage 21 is effected through the locked lever arm 54 and connecting rod 55a. Detent arrangement 53 is hydraulically connected to a portion of the hydraulic power source in a manner whereby levers 54 will be restrained in their neutral position though acted upon by mechanical forces applied to rod 55a equal to the frictional forces inherent in the linkage 21. Thus, it is preferred that actuator 13 drive or power linkage 21 during normal operation of the control system and hence no pilot efforts are additionally required at the control stick to overcome frictional resistance to motion existing within the linkage. Details of the detent arrangement 53 are more clearly shown in FIG. 5.

A blocking piston 55 is actuated by solenoid 56 to prevent the flow of high-pressure hydraulic fluid through passageway 57 enroute from the aircraft fluid pressure source to the valving member of electric valve 24 of FIG. 4. The blocking piston is preferably centered by spring means or the like (not shown) in such a manner that the passageway 57 is not blocked unless the solenoid 56 is energized. A piston 58 is connected to passageway 57 downstream of blocking piston 55 and cooperates with detent bar 59; piston 58 and its associated rod are moved downwardly by pressurized fluid and against spring 60 to urge detent bar 59 into cooperation with lever 54. Care must be taken in sizing the piston 58 and spring 60 with respect to anticipated operating pressures; pilot-applied forces transmitted through linkage 21 and which are in excess of the motion resistant frictional forces of that linkage should cause lever 54 to be released from restraint by downwardly urged detent bar 59.

FIG. 5 also illustrates a cockpit selector switch 61, movable between positions A and B, and a normally closed switch 62 cooperating with detent bar 59. These switches, as well as solenoid 56, are wired into appropriate electrical circuits as shown. This arrangement is inherently provided with "fail safe" features.

During routine flight operations selector switch 61 is positioned at A and pressurized hydraulic fluid passes through passageway 57 to the electric servo valve 24. Hydraulic forces acting on piston 58 lock lever 54 in its neutral position and thus assure re-positioning movement of linkage 21 during normal operation of the system. Should pilot-applied forces acting on lever 54 through rod 55a be sufficient to release lever 54 from detent bar 59, normally closed (NC) switch 62 will be released and moved from an open condition to its normally closed condition to thus cause the energizing of solenoid 56. Passageway 57 will then be blocked by piston 55 thus cutting off flow of pressurized fluid to servo valve 24 and to piston 58; lever 54 is then fully released from its restrained position. When lever 54 is returned to its neutral position, the system is re-set through the return of switch 62 to its actuated open condition thus de-energizing solenoid 56 and opening passageway 57 completely.

When manual operation of the system is desired, selector switch 61 may be placed in the B position to continuously energize solenoid 56 thus continuously blocking passageway 57 with the hereinbefore desired result of releasing lever 54 from restraint by the detent arrangement 53. Such operation may be continued until switch 61 is returned to its position A for normal operation of the control system. It is to be noted that the form of system illustrated in FIG. 2 may be provided with the selector switch for selectively de-energizing the solenoid of lock-out clutch 19.

A further method of providing for a detent-like arrangement to restrain lever arms 54 in their neutral position is to center the valve spools associated with actuator 13 with preloaded centering springs which are provided with pre-load values slightly in excess of the mechanical linkage friction.

In the arrangement of FIGS. 4 and 5 and the system associated therewith, use of a lock-out clutch component similar to device 19 of FIGS. 1 through 3 is not mandatory. As an alternate arrangement, a transverse take-up yoke may be associated with the control stick 16. A yoke of this nature will permit free-play rotation of control stick 16 throughout its normal zone of rotation; should the normal degree of free-play rotation be exceeded by the pilot in an emergency situation, a direct mechanical coupling is effected between control stick 16 and linkage 21 through the engaged yoke member.

Thus it will be noted that the aircraft control system of this invention is of a highly desirable form in that during normal flight operations the system is motivated throughout in a manner whereby the degree of artificial feel provided in the pilot actuated control stick portion of the system remains at initially intended ideal design levels. The system is further provided with emergency means whereby a direct mechanical coupling between the control stick portion of the system and the regulating members provided for directional control of powered actuators may be effected instantaneously without requiring lost-motion or take-up efforts on the part of the aircraft pilot. This latter arrangement is of such a nature that the energy-consuming mechanical linkage is continuously re-positioned for immediate take-up regardless of what the position of the control stick portion of the system might be; such is accomplished without requiring an expenditure of additional effort by the pilot.

It should also be noted that the system of this invention may be advantageously utilized with automatic pilot equipment and is of a form which permits visual monitoring of the automatic pilot during routine flight operations. In such situations, the pilot may selectively de-energize clutch member 19 and thus operationally couple the control stick 16 to the automatic pilot. Efforts or actions of the automatic pilot equipment are then displayed by movement of the control stick in a properly coordinated direction.

It is to be understood that the forms of the invention herein shown and described are to be taken as preferred embodiments of the same, but that various changes in the shape and size of parts may be resorted to without departing from the spirit of the invention or the scope of the subjoined claims.

I claim:

1. An improved aircraft control system having an instantaneous take-up capability provided therein with respect to effecting mechanical regulation of movement of a control surface essentially only during an emergency, comprising: a manual control member, movable actuator means connected to the control surface, an electrical linkage connected to said control member and normally regulating movement of said actuator means in response to manual movement of said control member, a movable mechanical linkage for regulating movement of said actuator means in response to manual movement of said control member essentially only during an emergency, separate means rigidly securing said mechanical linkage to said actuator means, and clutch means carried by said mechanical linkage for connecting said mechanical linkage to said control member, said clutch means being repositioned by said mechanical linkage, separate means, and actuator means in direct proportion to the degree of movement of said control member during normal regulation of said actuator means to thereby obtain said instantaneous take-up capability.

2. An improved aircraft control system having alternate modes of operation, and comprising: a manual control element, a flight control surface positioned in response to manual movement of said control element during each mode of system operation, movable power actuator means connected to said control surface for positioning said control surface, movable servo means connected to said power actuator means for controlling directional movement of said power actuator means and said control surface, an electrical linkage connected to said control element and to said servo means for regulating movement of said servo means, power actuator means, and control surface in response to manual movement of said control element during a first mode of system operation, a mechanical linkage continuously connected to said servo means and selectively connectable to said control element for regulating movement of said servo means, power actuator means, and control surface in response to manual movement of said control element during a second mode of system operation, lever and rod means interconnecting said mechanical linkage, servo means, and actuator means to effect movement in strict unison therebetween and electrical lock-out means for directly and selectively connecting said mechanical linkage to said control element during said second mode of system operation, said lock-out means having separated mutually engageable portions which are connected to said control element and said mechanical linkage and which are moved in 1:1 relation to each other respectively by a manual force introduced into said control element and by a boost force introduced into said mechanical linkage through said lever and rod means during movement of said servo means, power actuator means, and control surface during said first mode of operation, thereby obtaining a near-instantaneous take-up capability with respect to said control element and said second mode of system operation at all times without requiring lost-motion movement of said control element and without introducing adverse forces into said control element during said first mode of system operation.

3. The aircraft control system defined in claim 2, wherein said power actuator means is provided with a valve member which regulates directional movement of said power actuator means and said control surface, said valve member being rigidly connected to said lever and rod means and to said mechanical linkage whereby movement of said servo means during said first mode of system operation causes movement of said valve member and causes movement of said mechanical linkage and the portion of said lock-out means connected thereto.

4. In an aircraft control system having a flight control surface powered by a fluid actuator means which is movably regulated in response to movement of a control stick member, a mechanical means for obtaining instantaneous direct mechanical connection between the control stick member and the fluid actuator means essentially only in an emergency situation, said mechanical means including: a movable, force-transmitting linkage which requires a substantial force to effect movement thereof, rigid means continuously connecting one extreme of said linkage to the actuator means to transmit forces in excess of said substantial force from the actuator means to said linkage when the actuator means is moved, and a disconnect means first element connected to another extreme of said linkage, said disconnect means first element always being separated a sufficient distance from a cooperable element connected to control stick member and moved in unison therewith by said linkage when the actuator means is moved at times other than during said emergency situation.

References Cited in the file of this patent
UNITED STATES PATENTS

| | | |
|---|---|---|
| 2,590,029 | Minorsky | Mar. 18, 1952 |
| 2,823,879 | Smith et al. | Feb. 18, 1958 |
| 2,859,926 | Westbury | Nov. 11, 1958 |